United States Patent [11] 3,573,358

[72] Inventor Bob V. Markevitch
Palo Alto, Calif.
[21] Appl. No. 745,602
[22] Filed July 17, 1968
[45] Patented Apr. 6, 1971
[73] Assignee Ampex Corporation
Redwood City, Calif.

[54] TIMEBASE STABILIZATION AND CORRECTION SYSTEM FOR ELECTRON BEAM APPARATUS
10 Claims, 14 Drawing Figs.

[52] U.S. Cl. .......... 178/6.6A, 179/100.2CR, 178/6.7R
[51] Int. Cl. .......... G11b 5/04, H04n 3/18, H04n 3/22
[50] Field of Search .......... 178/6.7, 7.2 (D); 179/100.2 (CRT); 178/6.6 (A), 6.7 (R)

[56] References Cited
UNITED STATES PATENTS

| | | | |
|---|---|---|---|
| 3,131,384 | 4/1964 | Keitz et al. .......... | 179/100.2X |
| 3,304,377 | 2/1967 | Keitz et al. .......... | 179/100.2 |
| 3,347,997 | 10/1967 | Woodruff .......... | 178/6.6X |

*Primary Examiner*—James W. Moffitt
*Assistant Examiner*—Steven B. Pokotilow
*Attorney*—Robert G. Clay

ABSTRACT: At least one crystal controlled pilot signal, previously recorded on a recording medium, is synchronously demodulated on playback by the same crystal controlled frequency to provide line direction information, and by a quadrature signal to provide basic information on the playback raster size and centering errors, which are then introduced to the sweep generating circuits of the electron beam apparatus for timebase correction of the reproduce signals.

INVENTOR.
BOB V. MARKEVITCH

BY *Robert G. Clay*

ATTORNEY

INVENTOR.
BOB V. MARKEVITCH
BY Robert D. Clay
ATTORNEY

INVENTOR.
BOB V. MARKEVITCH

BY Robert S. Clay

ATTORNEY

INVENTOR
BOB V. MARKEVITCH

BY Robert G. Clay
ATTORNEY

TIMEBASE STABILIZATION AND CORRECTION SYSTEM FOR ELECTRON BEAM APPARATUS

The invention herein described was made in the course of a contract with the Department of United States Army.

BACKGROUND OF THE INVENTION

In the art of electron beam recording and reproducing, timebase compensation is required even though the scan size or position on playback is set equal to that used in the recording process. This is due to the fact that in actual operation the reproduce size and position is not the same as the record size and position. The difference in the record and reproduce size is generally attributed to the shrinkage of the recording medium or film during processing thereof. Further, due to the manufacturing tolerances allowed in the fabrication of recording mediums, the center of the raster tends to wander as the medium passes through the film gate in the transport of the electron beam apparatus. Both of these effects produce spurious signal components which deleteriously affect the quality of the reproduce process. Although amplitude modulation sidebands are produced as a result of the unevenness of the exposure in the vicinity of the scanning beam turnaround the most serious components are those produced by the effective frequency modulation of the carrier as the size and centering of the reproduce raster is varied with respect to the record raster.

SUMMARY OF THE INVENTION

The present invention is a system for providing signals for timebase stabilization and correction of electron beam reproduce signals, as well as for detection of line direction. A crystal controlled pilot of selected frequency is placed on the recording medium, hereinafter defined as film, during the record process. During the reproduce process, the same crystal and divider used in the record process provide a reference frequency equal to the selected pilot frequency. This reference frequency is fed directly to an in-phase multiplier and also to a quadrature multiplier via a 90° phase shifter. The pilot reproduced from the film is fed to the in-phase and quadrature multipliers. The in-phase multiplier output is a positive, direct current (DC) signal if the lines are properly tracked in the forward direction.

The quadrature reference frequency is multiplied by the line repetition frequency and the output of this multiplier is multiplied by the pilot reproduced from the film. The output from this multiplier contains signals representative of the size error.

The quadrature frequency is also multiplied by one-half the line frequency and the output of this multiplier is multiplied by the pilot reproduced from the film. The output from this multiplier contains signals representative of the centering error.

In the single pilot system, the multipliers are designated by the terms "in-phase" and "quadrature" for simplicity of description of the circuit, since the multipliers handle the in-phase and quadrature signals respectively. The multipliers referred to throughout the description are similar in design and function.

BRIEF DESCRIPTION OF THE DRAWING

FIG. 9 is a simplified schematic diagram of a reproduce apparatus such as that of FIG. 7, but using multiple pilot signals to effect timebase stabilization and correction.

DESCRIPTION OF THE PREFERRED EMBODIMENTS

Figure 1A:
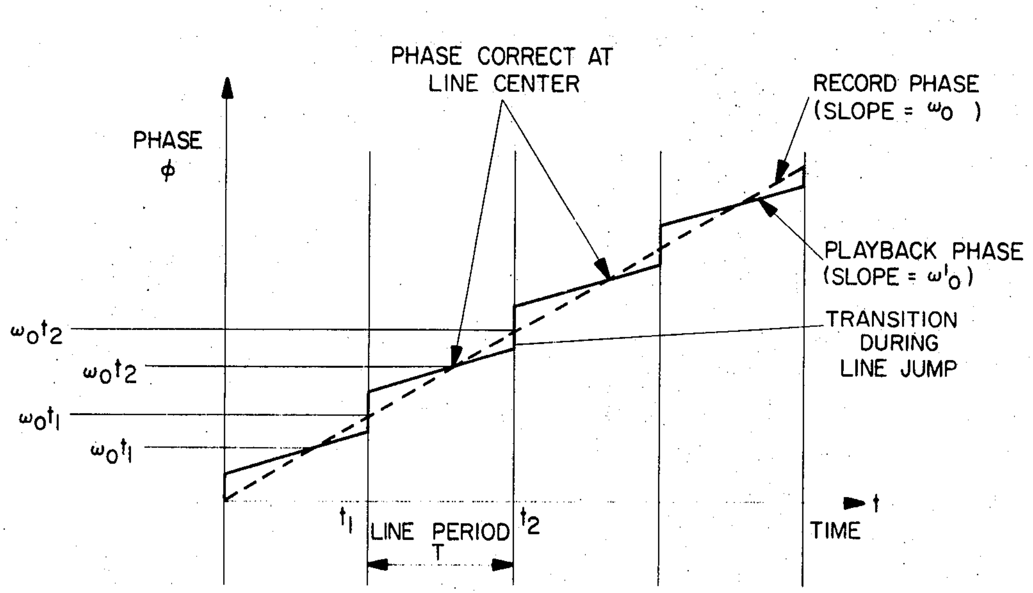
FIGS. 1A and 1B are graphs of the phase angle and phase error as a function of time, due to wrong size during playback.
Figure 1B:
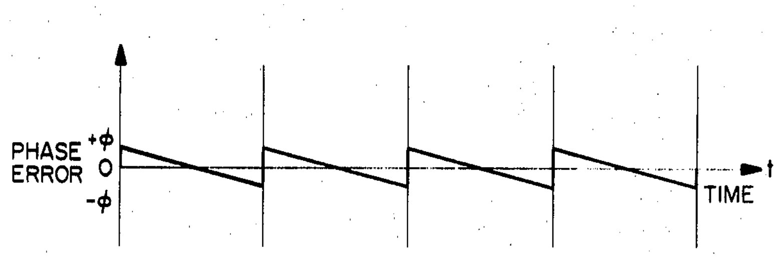

A single-frequency signal cos $\omega_o t$, has a constantly advancing phase $\omega_o t$. If this signal is recorded on film, and properly played back, the output will have the identical wave shape, and the phase angle as a function of time will still be $\omega_o t$, as it was during recording. Consider, however, a single line starting at time $t_1$ and ending at time $t_2$. During that interval, the recorded phase angle will start at $\omega_o t_1$ and increase to $\omega o t_2$ at the rate of $\omega_o$ radians per second. If this line is played back with a shorter scan than that used during recording, not all of the recorded cycles will be played back even though the length of time to play back this smaller number of radians remains the same. This would, at first, seem to imply a lower playback frequency than the recorded frequency. This reduced rate of phase increase may be shown as a line of reduced slop, $\omega_o'$. The total angle reproduced on playback, between times $t_1$ and $t_2$ is, therefore, $\omega_o'(t_2—t)$, and the error repeats with each successive line. Since the timing of each line and the length of each line in terms of time is maintained with crystal accuracy, timing and phase are "reestablished" at every line. If the raster is properly centered, the phase will be exactly correct at the center of each line. This occurs because the recording time $T$ from the center of one line to the center of the next line on playback will be exactly equal to the corresponding playback time and the playback beam has then physically moved from one particular record phase to a phase angle $\omega_o T$, at a line period $T$ later. Since phase is reestablished from line to line, but since not all of the radians are played back during each line, phase must be gained nearly instantaneously at the ends of each line. This, in fact, can be verified experimentally, as the beam jumps from one line to the next before actually reaching the end of the recorded line, thereby skipping some number of radians at the end of each line. The comparison of the record and playback phase angles for such a situation is shown in the FIG. 1A. The dashed line is the recorded phase; the solid line the playback phase. FIG. 1B shows the phase error having a sawtooth waveform with zero average amplitude, and peak amplitude of $\Phi$ and clearly demonstrates the phase modulation which results.

To describe the effects of small errors in size, the coefficient $C_n$ is expressed as:

$$C_n=\frac{\sin(\phi-n\pi)}{(\phi-n\pi)}=\frac{(-1)^{|n|}\sin\phi}{(\phi-n\pi)} \qquad (1)$$

where $n$ is a positive or negative integer, and $\Phi$ is the phase error introduced by under or overscanning each half-line. For proper playback, $\Phi$ must be much smaller than $\pi$ and therefore, for $n$ 0, $$C_n=(-1)^{|n|}\frac{\phi}{-n\pi} \qquad (2)$$

Since $n$ can only be a positive or negative integer, the spectrum of the playback signal is thus composed of discrete lines occurring at the frequencies $(\omega_o+n\omega_m)$. The amplitude of these spectral lines is equal to $C_n$, and it can be shown that their envelope is:

$$\frac{\sin\left(\phi-\pi_2\frac{(\omega_o-\omega)}{\omega_m}\right)}{\left(\phi-\pi\frac{(\omega_o-\omega)}{\omega_m}\right)}$$

With zero scan size error ($\Phi=0$), the envelope is centered at $\omega_0$; if the lines are underscanned ($\Phi<0$), the envelope center shifts to a lower frequency and results in a downward shift of the center of energy. The converse is true for overscanned ($\Phi>0$ lines.

Figure 2:
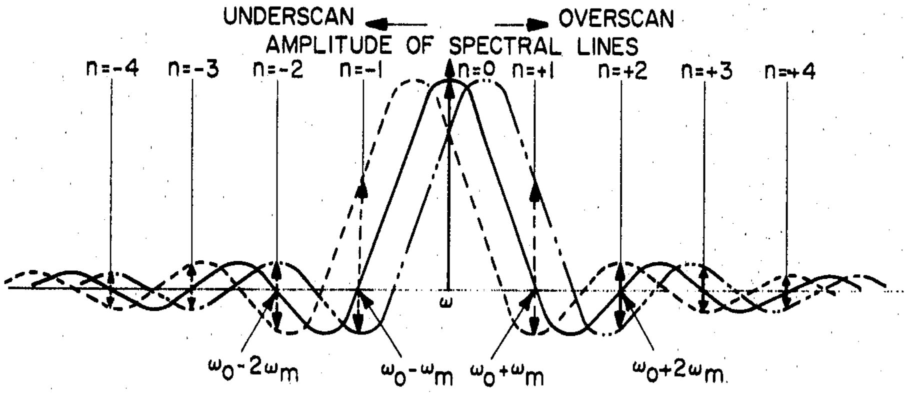
FIG. 2 is a graph of the envelopes of the spectral lines showing the variation of the carrier and FM sideband amplitude as the scan amplitude (size) is varied.

The scan size errors discussed supra are illustrated graphically in FIG. 2 where the solid-line envelope represents the zero error condition and the two broken line envelopes represent the under and overscanned conditions, respectively. As can be seen in the FIG. 2, the results of this analysis can be exploited by adding a sinewave control signal (pilot) into the input signal of the recorder, and examining the playback signal for the amplitudes of the corresponding spectral lines, in accordance with equation 2. FIG. 2 shows that location of the pilot and the sidebands are fixed even though the playback frequency of each line may be wrong, the frequency of the original carrier remains correct and dependent only upon the accuracy of the line repetition frequency determined by the crystal clock. FIG. 2 also depicts why the monitoring of the carrier frequency by a communications receiver with narrow bandwidth does not indicate any frequency change even when the raster size control is varied over large limits. If a wide frequency discriminator is used, however, so that a number of the sidebands are included in the demodulation, the detector will sense the center of energy and will indicate a frequency shift.

Figure 3A:
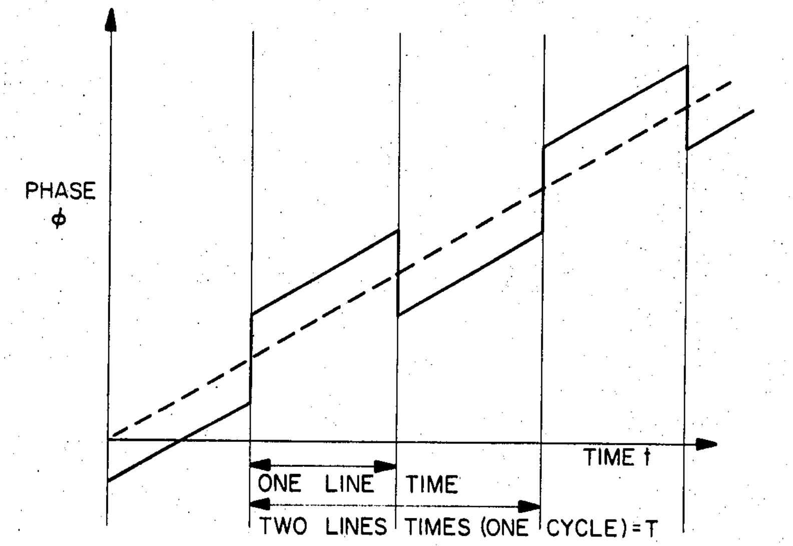
FIGS. 3A, 3B are graphs of the phase angle and phase error as functions of time, due to miscentering during playback.
Figure 3B:
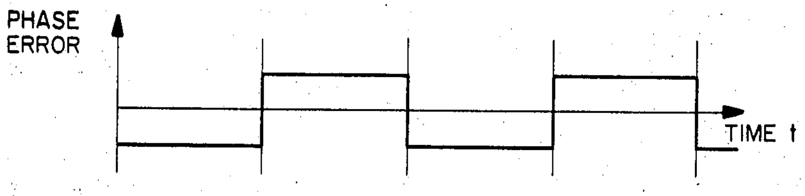

The effect of miscentering can be considered in the same light as playing back a recorded raster with a scan of wrong size. However, in the case of miscentering the rate of change of phase is correct on all lines, but successive lines are alternately played slightly too early (by $\Phi$ radians) and slightly too late (by $\Phi$ radians) respectively. Then the third line is played too early and the fourth line too late again, and so forth. This produces a square wave phase modulation and is shown diagrammatically in FIG. 3A. The corresponding phase error diagram is shown in FIG. 3B.

Figures 4A, 4B, 4C, 4D:
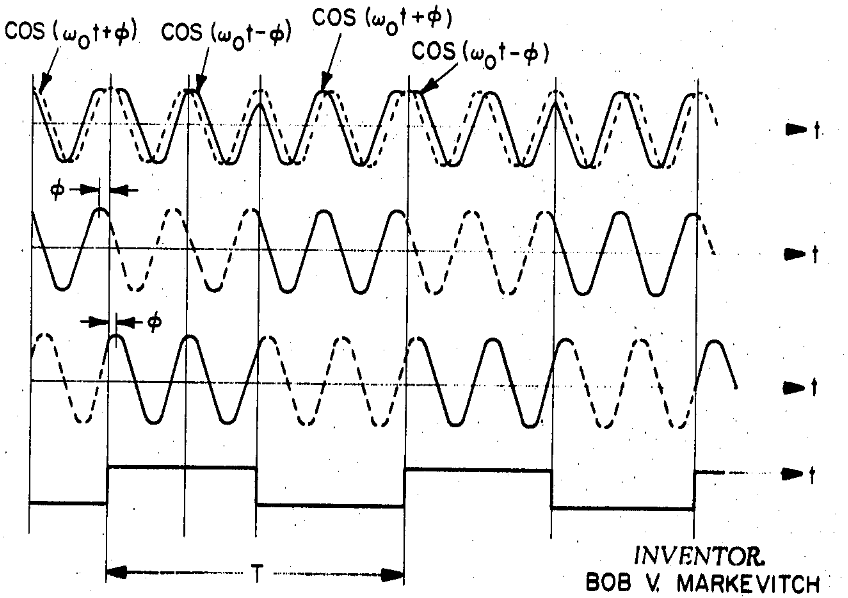
FIGS. 4A, 4B, 4C, 4D are graphs of waveforms showing the decomposition of a cosine wave phase modulated by a square wave.

The broken line of FIG. 4A shows a recorded wave ($\cos\omega_o t$) played back in this manner, and the distortion resulting from miscentering is represented by the solid curve. The playback waveform is repeated every interval $T$, which is two times the length of one line. FIG. 4B and 4C show the decomposition of this distorted wave into two cosine waves, one shifted ahead by $\Phi$ radians and one retarded by $\Phi$ radians, that are alternately switched on and off by a square wave of period $T$ shown in FIG. 4D. Each half-cycle of FIGS. 4B and 4C is therefore equivalent to time multiplication of a cosine wave (FIG. 4C) with a switching function (FIG. 4D).

The relationship which describes the effect of miscentering is:

$$e_o=\sum_{k=0}^{+\infty}\frac{-2\sin\phi_o}{(2k+1)\pi}\cos\,[\omega_o-(2k+1)\omega_m]t+\cos\phi_o\cos\omega_o t$$
$$+\sum_{k=0}^{+\infty}\frac{2\sin\phi_o}{(2k+1)\pi}\cos\,[\omega_o t(2k+1)\omega_m]t \qquad (3)$$

where $e_o$ is the playback signal, $k$ is the number of the line being scanned, and $t$ is the time. In this equation, the first sum represents the lower sidebands; the midterm, the carrier; and the last sum the upper sidebands; no sidebands can exist at even multiples of $\omega_m$.

Previously, it was shown that playback with incorrect scan size results in sidebands of a recorded pilot signal, spaced at line frequency away from the carrier. Also, it was shown that miscentering will also result in sidebands, but spaced only at intervals corresponding to half the line frequency. Moreover, only odd-numbered sidebands exist for this type of error. As a consequence of these observations, it is possible to extract and separate scan size and centering information, by testing for sidebands of a recorded pilot at line frequency and at half the line frequency away from the carrier, respectively.

From equation 3, miscentering gives rise to a first sideband amplitude of $(2/\pi)\sin\Phi_o$, spaced at half the line frequency from the pilot. From equation 1, incorrect scan size causes a first sideband amplitude of approximately $(1/\pi)\sin\Phi$, (with $\Phi<<\pi$), spaced at line frequency from the pilot. These relations have shown that miscentering causes twice the sideband amplitude when compared with an equal scan-size error.

It is generally apparent that amplitude modulation of the carrier can also occur due to unevenness of exposure at the ends of the lines. An optimum means of detecting size error and centering error is a device insensitive to amplitude modulation but sensitive to frequency modulation.

Accordingly, when a carrier, which is both amplitude and frequency modulated, is applied to one input of a synchronous detector, and an unmodulated carrier (reference) of the same frequency and phase is applied to the other, the output will consist of three signals: a DC level, a signal corresponding to the information originally used to amplitude modulate the carrier, and a carrier at double the frequency of the original carrier but still, as was the input, both amplitude-and-frequency modulated. It will not contain any component at the frequency of the original carrier; nor will it contain any information corresponding to the signal used to frequency modulate the original carrier. If, however, the reference and the modulated carrier are 90° out of phase, then the output will not contain demodulated AM information or a DC level. Instead, this channel will provide detection of frequency modulated and the amplitude- and frequency-modulated carrier at twice the frequency of the original carrier.

Figure 5:
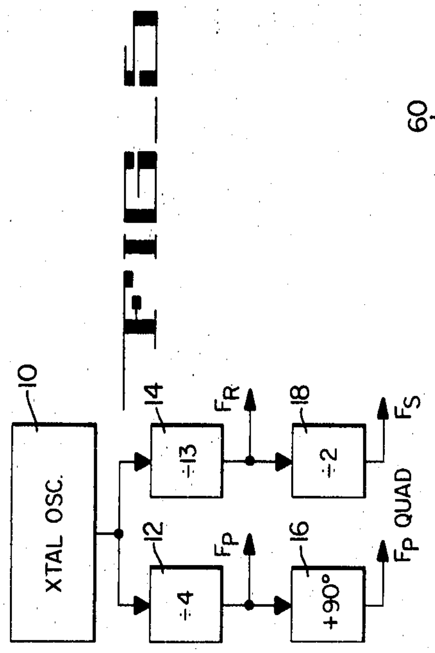
FIG. 5 is a simplified schematic diagram of a clock circuit for providing the various signals for use in the record and reproduce apparatus.
Figure 8:
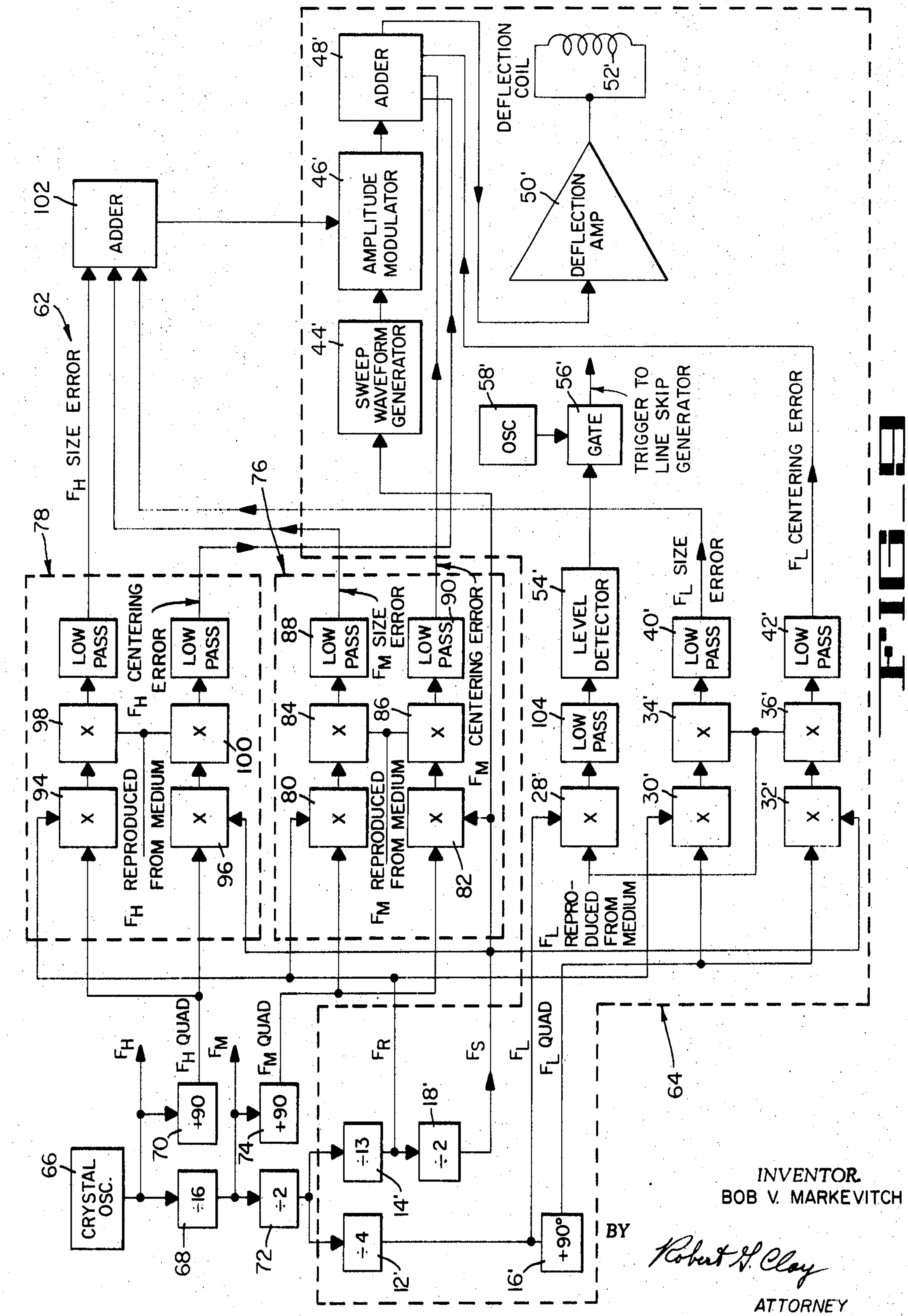

Referring now to FIG. 5, there is shown by way of example, a clock circuit which provides a pilot signal ($F_P$), a line repetition frequency signal ($F_R$) and a scan waveform repetition frequency signal ($F_S$) of selected frequencies. The signals are used in the record and reproduce circuits shown in FIGS. 6 and 7. For simplicity of description, the invention is discussed with reference to specific frequencies, however, it is to be understood that the values of the various frequencies are utilized herein by way of example only. Various other frequencies may be utilized instead, as is further described hereinafter, particularly with the multiple pilot system shown in FIG. 8.

A crystal oscillator 10, for example, 204 kilohertz (kHz.) is connected to a frequency dividers 12 and 14 which divide the output of oscillator 10 by 4 and 13 respectively. The output from divider 12 is the pilot signal $F_P$, having a frequency of 51 kHz. which is recorded on the recording medium or film (not shown) by means of for example the record circuit of FIG. 6. A 90° phase shifter 16 is connected to the divider 12 to provide a quadrature pilot signal ($F_P$Quad). The output from divider 14 is the line repetition frequency signal $F_R$, having in this example, a frequency of 15.7 kHz. A divider 18 is coupled to the divider 14 and provides the scan waveform repetition frequency signal $F_S$, which is fed to the line trigger (not shown), to produce the sweep frequency for the record and reproduce processes.

One of the criteria for the selection of the pilot frequency, in the example described herein, is that it be outside of the passband of 50 kHz. to 5 MHz., although the highest possible frequency will give the greatest final accuracy. The use of phase detection techniques depends on the initial error being less than ¼-cycle. Since the initial error in centering may be as large as 5 percent of the line, the highest reasonable frequency that may be used for coarse servoing is, for example, 80 kHz. Since this frequency is already within the signal channel of the system, but not far from the low end, a preferred pilot frequency for this example is 51 kHz.

Another requirement is that the pilot frequency be phase locked to the scanning waveform. For example, as in prior systems, if an integral multiple of the line rate of 15.7 kHz. were selected, the phase detection system would always be able to position and size the raster correctly no matter which line the system is playing back. Such a pilot in no way discriminates between the right and wrong lines should the machine lock on the wrong one, and full use will not be made of the time base detection system. The next obvious choice would be a pilot of odd multiple of half the line frequency; i.e., 7.85 kHz., giving half a cycle per line; or 23.55 kHz., giving three half-cycles per line. Then the in-phase channel of the timebase detection system gives a positive DC level if the playback is on the correct lines, but would give a negative DC level if the lines are scanned backwards.

The present playback system generates some amplitude modulation of a recorded carrier at the ends of the lines due to a small change in beam velocity as the beam slows down, stops, and reverses at the end of each scan. This produces a transient in the average (DC) signal and therefore generates noise with a line spectrum starting at DC and lines spaced at 7.85 kHz. intervals with a (sine $x$) /$x$ envelope. If a pilot, which is also a multiple of 7.85 kHz. (the half of the line frequency chosen for the example) is chosen, not only will one of the noise spectral lines fall on top of the pilot frequency, but the noise spectral lines will also fall on top of the FM sidebands which carry the important size and centering information, thereby greatly reducing the signal-to-noise ratio of the error detection channel. Thus, it is better to place the pilot frequency exactly between the noise spectral lines. The obvious choice is an odd multiple of ¼-line rate in the vicinity of 50 kHz., which in the example herein described was selected as 51 kHz.

Figure 6:
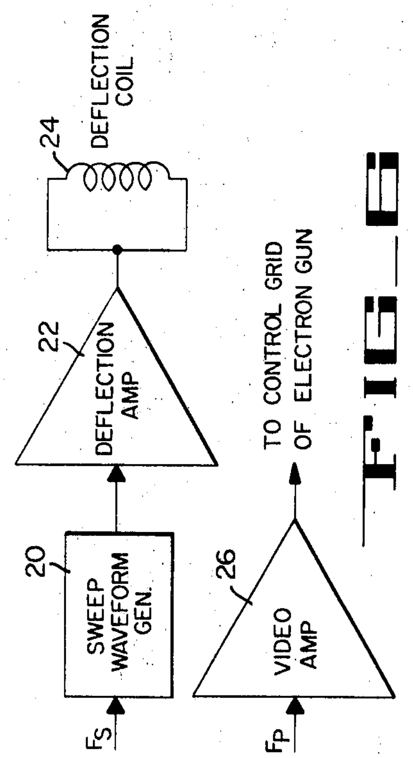
FIG. 6 is a simplified schematic diagram depicting the record apparatus for placing a crystal controlled pilot on the recording medium in accordance with the invention.

Referring to FIG. 6, there is shown apparatus for recording the pilot on film, and for utilizing the signal $F_S$. A sweep waveform generator 20 receives the scan waveform repetition frequency signal $F_S$, and is coupled in turn to a deflection amplifier 22 which provides a deflection signal to a deflection coil 24 of the beam sweep apparatus.

The pilot signal $F_P$is introduced to a video amplifier 26 and from thence to the control grid of the electron gun which provides the beam to expose the film, and thus record the pilot signal on the film.

Figures 7, 8:
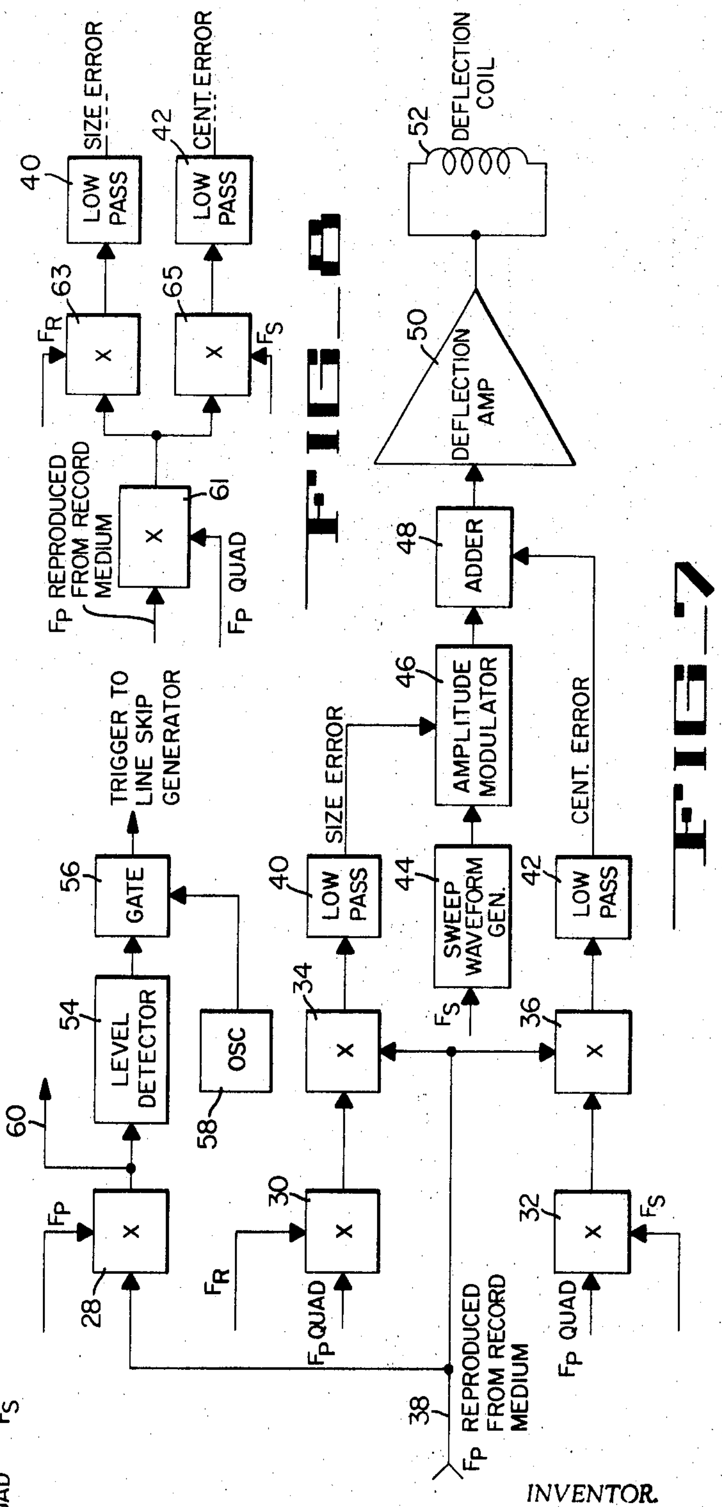
FIGS. 7 and 8 are simplified schematic diagrams of two embodiments of reproduce apparatus for providing timebase stabilization and correction in accordance with the invention using a single pilot signal.

Referring now to FIG. 7, there is shown the playback apparatus of the invention, which is coupled via the inputs thereof, to the output signals provided by the clock circuit of FIG. 5 and by readout of the pilot signal $F_P$from the recording medium. In practice, the same oscillator and dividers are used in both the record apparatus of FIG. 6 and the reproduce apparatus of FIG. 7. Thus, a 51 kHz. reference frequency signal $F_P$ is fed directly to a multiplier 28 from the divider 12, and a quadrature signal from the phase shifter 16 is also introduced to a pair of multipliers 30 and 32. The 90° phase shifter 16 delays the reference frequency signal by 90°. The line repetition frequency signal $F_R$ is introduced to multiplier 30 and the scan waveform repetition frequency signal $F_S$ is introduced to the multiplier 32.

The pilot signal, which is previously recorded on the medium, is reproduced by the system of FIG. 7 and is introduced by a pair of multipliers 34 and 36 respectively via an input line 38. The multipliers 34 and 36 are coupled to the multipliers 30 and 32 respectively. Low-pass filters 40 and 42 are coupled respectively to the multipliers 34 and 36 and provide a size error signal and a centering error signal respectively.

To simplify the description, the multipliers 28, 34 and 36 may be designated as in-phase multipliers, since they receive an in-phase signal, e.g., $F_P$ from the film. The multipliers 30 and 32 thus may be designated as quadrature multipliers since they receive a quadrature signal, e.g., $F_P$Quad.

The signal $F_S$ is also coupled to a sweep waveform generator 44 and the output is coupled to an amplitude modulator 46, which also receives the size error signal from the low-pass filter 40. An adder 48 is coupled to the amplitude modulator 46 and also receives the centering error signal from the low-pass filter 42. A deflection amplifier 50 is coupled to the adder 48 and provides an output to a deflection coil 52 of the beam sweep generating apparatus. The pilot signal $F_P$, read from the medium, is also coupled via the line 38 to the multiplier 28, and the output therefrom is introduced to a level detector 54, preferably via a suitable filter (not shown). A gate 56 is connected to the level detector 54, and also receives a signal from an oscillator 58. The output of the gate 56 provides the trigger signal for the line skip generator (not shown) which is coupled to the sweep generating apparatus.

In operation, the output of the (in-phase) multiplier 28 provides a positive signal if the recorded lines are being properly tracked and read in the forward or correct direction by the reproduce apparatus. If the lines are read backwards, the average voltage is zero because of the choice of an odd multiple of a quarter-line frequency for the pilot. Further, even if the lines are read in the correct direction there is still the possibility that the pilot signal, is exactly 180° out of phase with the reference signal, which generates a negative signal. If this had not also reversed the sense of the demodulated FM, the combination would be interpreted as a "correct" line. However, in the invention circuit, because of the change of sense, the result is a positive rather than a negative feedback in both the size and centering error channels. Therefore, only one out of four possible lines is considered correct and that one produces a positive DC signal that is then fed to the level detector 54, which in turn provides a "correct" level signal.

To separate the 7.85 and 15.7 kHz. FM signals produced by the centering and size errors respectively, the outputs of the multipliers 30, 32 are fed to the two multipliers 34 and 36. For clarity the errors will now be discussed separately.

Regarding the size error signal, the 15.7 kHz. reference $F_R$ is fed to the multiplier 30, preferably through an adjustable delay circuit (not shown) which compensates for phase shifts in the system. If there is a 15.7 kHz. FM signal present in the $F_P$, the reproduce pilot, the multiplier 34 demodulates it and the error appears as a DC level at the output thereof, wherein its sense depends upon whether the film is being overscanned or underscanned. The resulting signal is passed through the low-pass filter 40 to the amplitude modulator 46 to provide for size control of the sweep generating apparatus.

An identical function is followed for utilizing the centering error signal. The frequency of the 15.7 kHz. signal from the divider 14 is divided by two by the divider 18 to provide the signal $F_S$, is preferably passed through a delay circuit (not shown) to compensate for system phase shifts, and is multiplied by the quadrature signal $F_P$Quad in the multiplier 32. The resulting output of 32 is multiplied by the reproduce pilot signal $F_P$ from the tape, in the multiplier 36. The resulting output signal is then filtered in the low-pass filter 42, is added to the output of the amplitude modulator 46 in the adder 48, and is then fed to the deflection amplifier 50 and the deflection coil 52 of the sweep generating apparatus. This then corrects for centering errors.

A voice channel may be added if desired by amplitude modulating the 51 kHz. pilot signal. The demodulated AM would also be available at the output of the multiplier 28, as indicated at numeral 60. A low-pass filter (not shown) is necessary in the output circuit to admit only the voice bandwidth to an amplifier and speaker (not shown).

In a modification of the FIG. 7 circuit as shown in FIG. 8, the pair of multipliers 30, 32 may be replaced in effect by a single multiplier 61 which receives the signals $F_P$Quad and $F_P$ read from the medium. A pair of multipliers 63 and 65 are coupled to the output of the single multiplier 61 and from thence to the respective filters 40 and 42. In the modification the multipliers 63 and 65 are adapted to receive the signals $F_R$ and $F_S$, which in FIG. 7 are shown introduced to multipliers 30, 32. The remainder of the reproduce circuitry of FIG. 8 is identical to that of FIG. 7.

Thus, it may be seen that the error signals (with respect to time) are each obtained by multiplying the signal, by the reference, by the respective line rate (all with respect to time). The order in which the signal, reference and line rate are multiplied accordingly is not critical. Thus various modifications are possible in the circuit of FIG. 7 within the inventive concept.

Referring now to FIG. 9 there is shown an alternative embodiment 62 of the invention, utilizing a plurality of pilot signals rather than the single pilot signal $F_P$ of FIGS. 5—8. The embodiment 62 is the reproduce portion of the apparatus and includes a clock circuit similar to that shown in FIG. 5 but which is further adapted to provide a plurality of pilot signals rather than just one.

A record circuit analogous to that of FIG. 6, but adapted for a plurality of pilot signals, is not shown. However, it is to be understood that such a record circuit is similar to that described in FIG. 6, but further includes an adder circuit disposed prior to the video amplifier (26), wherein the plurality of pilot signals received from the multiple signal clock circuit are first added together, then amplified and introduced thereafter to the recording medium to be stored thereon. The combined recorded pilot signals are separated upon readout to provide the plurality of pilot signals obtained from the film for use in the reproduce system of FIG. 9, as further described hereafter.

Thus, the circuit of FIG. 9 is formed of essentially the combined circuit of FIGS. 5 and 7 (herein shown within the block numbered 64) and further including added clock means for generating and applying additional pilot signals. Whereas the single pilot signal in FIGS. 5—7 was designated as $F_P$, the three pilot signals of FIG. 9 are defined as the low, medium and high pilot signals $F_L$, $F_M$, and $F_H$, respectively. Pilot signal $F_L$ may be said to correspond to the previous pilot signal $F_P$.

Accordingly a crystal oscillator 66 provides the pilot signal $F_H$, and in addition, is coupled to a divider 68, and to a +90° phase shifter 70. The shifter 70 provides a quadrature signal $F_H$Quad. The divider 68 provides the pilot signal $F_M$ and is coupled to a divider 72 and a +90° phase shifter 74. The shifter 74 provides a quadrature signal $F_M$Quad, and the divider 72 is coupled to dividers 12′ and 14′ which correspond to dividers 12 and 14 of FIG. 5. As may be seen, the rest of the clock circuit (as well as the rest of the reproduce circuit) within block 64 is similar to that of FIG. 7 and accordingly like components utilize the same numerals, with those of FIG. 9 further including a superscript. In FIG. 9, the +90° phase shifter 16′ provides the pilot signal $F_L$Quad, the divider 12′ provides the pilot signal $F_L$, and signals $F_R$ and $F_S$ are provided by the dividers 14′ and 18′ respectively.

The circuit further includes additional channels for utilizing the pilot signals $F_M$ and $F_H$, which channels are generally shown in the blocks 76 and 78 respectively. Although two additional pilot signals and two channels are described herein, the number of pilot signals employed may vary. As may be seen, the circuits of blocks 76 and 78 are identical to the analogous portion of the circuit in block 64. For example, multipliers 80 and 82 correspond to multipliers 30′ and 32′, multipliers 84 and 86 correspond to multipliers 34′ and 36′ and low-pass filters 88 and 90 correspond to low-pass filters 40′ and 42′. Likewise, the signals $F_R$ and $F_S$ are introduced to multipliers 80 and 82. However, the remaining inputs include the pilot signal $F_M$ reproduced from the recording medium, which is fed to the multipliers 84 and 86, and the quadrature signal $F_M$Quad which is fed to the multipliers 80 and 82.

The circuit of block 78 is identical with that of block 76, wherein $F_R$ and $F_S$ are supplied to the multipliers 94, 96. However, the multipliers 98, 100 are supplied with the pilot signal $F_H$ reproduced from the recording medium, and the multipliers 94, 96 are further supplied with the quadrature signal $F_H$Quad.

Each channel of the reproduce circuit provides a size and centering error signal which is fed to its respective portion of the sweep generating circuits. Thus, the $F_L$, $F_M$ and $F_H$ centering error signals are fed to an adder 48′, and the $E_L$, $F_M$ and $F_H$ size errors are fed to an adder 102. Adder 102 is coupled to the amplitude modulator 46′. Note that in the circuit of block 64, a low-pass filter 104 is provided between the multiplier 28′ and the level detector 54′.

The three pilot system of FIG. 9 provides an improvement over the single pilot system of FIGS. 5—8 in that finer and finer adjustment of both size and centering can be achieved as the pilot frequency is raised due to improved time resolution. If the initial error is greater than a quarter of a cycle of the pilot frequency, then ambiguity results. Therefore, low frequency pilots are provided for the correction of initially large errors while the high frequency pilot is provided for greater precision once the initial error has been sufficiently reduced.

Although the invention has been described herein with respect to various embodiments, it is to be understood that various modifications could be made thereto within the spirit of the invention.

Thus, it is not intended to limit the invention except as defined in the following claims.

I claim:

1. A system for effecting timebase stabilization and correction of electron beam reproduce signals recorded on an electron beam recording medium by a scanning electron beam, while detecting line direction of the scanning beam, wherein at least one pilot signal is recorded on the medium and said electron beam is controlled by sweep generating apparatus including an electron beam source, comprising the combination of:

means for introducing a pilot signal of selected frequency from the recording medium;

reference signal generating means for generating a plurality of reference signals of selected frequencies wherein one of the reference signals is a quadrature reference signal associated with a pilot reference signal;

first and third means each coupled to receive at least one of said reference signals and also said pilot signal from the medium, the first means being adapted to provide an inphase output signal indicative of the accuracy and direction of the scanning beam, and the third means being adapted to provide quadrature initiated output signals indicative of the playback raster size and centering errors; and second means coupled to receive the quadrature initiated output signals from said third means and adapted to provide playback raster size and centering control error signals, said error signals being introduced to the sweep generating apparatus to correct corresponding errors in the size of the scan raster and the centering of the raster respectively on the medium during playback.

2. The system of claim 1 wherein:

said means for introducing a pilot signal introduces a plurality of pilot signals from the medium at selected frequencies;

said reference signal generating means in addition to the reference signals further provides a plurality of pilot reference signals and a plurality of quadrature reference signals corresponding to the plurality of pilot reference signals;

said first means includes a multiplier coupled to a selected one of the pilot reference signals and to the corresponding pilot reference signal from the medium to generate said in-phase output signal indicative of the accuracy and direction of the scanning beam;

said third means defines a plurality of channels equal to the plurality of pilot signals from the medium, wherein each channel of the third means receives a respective pilot signal from the medium of selected frequency, a quadrature reference signal corresponding to the respective pilot signal from the medium, and selected reference signals, and each provides pairs of the quadrature initiated output signals therefrom indicative of the playback raster size and centering errors;

said second means defines a similar plurality of channels wherein each channel receives a respective pair of the quadrature initiated output signals from said third means and is further adapted to provide a plurality of pairs of said reproduce raster size and centering control error signals; and said system further including adder means for combining the respective plurality of size control error signals and the plurality of centering control error signals and for selectively applying same to said sweep generating apparatus to control the scanning electron beam.

3. The system of claim 1 wherein the first means includes first multiplier means coupled to receive the pilot reference signal and said pilot signal from the medium to provide the in-phase output signal, and the third means includes second multiplier means for receiving said pilot signal from the medium and said quadrature reference signal to provide an initial quadrature output signal corresponding to a multiplication of the pilot signal from the medium and the quadrature reference signal.

4. The system of claim 3 wherein the third means further includes third multiplier means for receiving the initial quadrature output signal from the second multiplier means and a reference signal from said plurality generated by the reference signal generating means to provide the quadrature initiated output signal corresponding to the size control error signal, and fourth multiplier means for receiving the initial quadrature output signal from the second multiplier means and another reference signal from said plurality generated by the reference signal generating means to provide the quadrature initiated output signal corresponding to the centering control error signal.

5. The system of claim 1 wherein the first means includes first multiplier means coupled to receive the pilot reference signal and said pilot signal from the medium to provide the in-phase output signal, and fifth multiplier means for receiving said quadrature reference signal and others of said plurality of reference signals from said reference signal generating means to provide initial quadrature output signals in the form of initial size and centering quadrature output signals corresponding to a multiplication of the quadrature reference signal and respective ones of the reference signals.

6. The system of claim 5 wherein the third means further includes sixth multiplier means for receiving the initial size quadrature output signal from the fifth multiplier means and the pilot signal from the medium to provide the quadrature initiated output signal corresponding to the size control error signal, and seventh multiplier means for receiving the initial centering quadrature output signal from the fifth multiplier means and the pilot signal from the medium to provide the quadrature initiated output signal corresponding to the centering control error signal.

7. The system of claim 1 wherein the reference signal generating means includes an oscillator means for generating a primary reference signal, a line rate reference signal, a $1/n$ line rate reference signal where $1/n$ is a selected fraction of the line rate frequency, and further includes phase shifting means operatively coupled to the oscillator means to selectively phase shift the primary reference signal to provide the quadrature reference signal.

8. The system of claim 7 wherein the oscillator means further comprises a crystal oscillator, and the signal generating means further includes a plurality of dividers selectively coupled to the crystal oscillator to provide said line rate reference signal and said $1/n$ line rate reference signal, said phase shifting means being operatively coupled to the crystal oscillator to phase shift said primary reference signal to provide the quadrature reference signal.

9. The system of claim 8 wherein said first means further includes a multiplier coupled to said primary reference signal and to said pilot signal from the medium to generate said in-phase output signal indicative of the accuracy and direction of the scanning beam, and the third means includes a quadrature multiplier coupled to said quadrature reference signal from the phase shifting means and to said pilot signal from the medium to generate an initial quadrature output signal, wherein said third means further includes a size error multiplier coupled to the initial quadrature output signal and to said line rate reference signal to generate the quadrature initiated output signal indicative of the playback raster size error, and a centering error multiplier coupled to the initial quadrature output signal and to said $1/n$ line rate reference signal to generate the quadrature initiated output signal indicative of the playback raster centering error.

10. The system of claim 8 wherein said first means further includes a multiplier coupled to said primary reference signal and to said pilot signal from the medium to generate said in-phase output signal indicative of the accuracy and direction of the scanning beam, and the third means includes a pair of quadrature multipliers each coupled to the quadrature reference signal from the phase shifting means, the first of said pair of quadrature multipliers also being coupled to said line rate reference signal to generate an initial size quadrature output signal, and the second of said pair of quadrature multipliers being coupled to said $1/n$ line rate reference signal to generate an initial centering quadrature output signal, wherein the initial size and centering quadrature output signals are indicative respectively of the playback raster size and centering errors, wherein the third means further includes a size error multiplier coupled to the initial size quadrature output signal and to said pilot signal from the medium to generate the quadrature initiated output signal indicative of the playback raster size error, and a centering error multiplier coupled to the initial centering quadrature output signal and to said pilot signal from the medium to generate the quadrature initiated output signal indicative of the playback raster centering error.